(12) United States Patent
Pearson et al.

(10) Patent No.: US 7,516,480 B2
(45) Date of Patent: Apr. 7, 2009

(54) SECURE REMOTE CONFIGURATION OF TARGETED DEVICES USING A STANDARD MESSAGE TRANSPORT PROTOCOL

(75) Inventors: Malcolm E. Pearson, Kirkland, WA (US); Leon R. Warman, Kirkland, WA (US); Robert G. Atkinson, Woodinville, WA (US); David R. Reed, Seattle, WA (US); Steven D. White, Bellevue, WA (US); Bradford R. Clark, Duvall, WA (US)

(73) Assignee: Microsoft Corporation, Redmond, WA (US)

( * ) Notice: Subject to any disclaimer, the term of this patent is extended or adjusted under 35 U.S.C. 154(b) by 692 days.

(21) Appl. No.: 10/971,402

(22) Filed: Oct. 22, 2004

(65) Prior Publication Data
US 2006/0090195 A1 Apr. 27, 2006

(51) Int. Cl.
G06F 7/04 (2006.01)
(52) U.S. Cl. .............................. 726/3; 713/152; 726/26
(58) Field of Classification Search ................. 713/152; 726/26
See application file for complete search history.

(56) References Cited

U.S. PATENT DOCUMENTS

| | | | |
|---|---|---|---|
| 5,748,888 A * | 5/1998 | Angelo et al. ................. 726/26 |
| 5,982,899 A | 11/1999 | Probst | |
| 6,697,942 B1 * | 2/2004 | L'Heureux et al. .......... 713/152 |
| 7,127,743 B1 | 10/2006 | Khanolkar et al. | |
| 7,155,514 B1 | 12/2006 | Milford | |
| 7,293,171 B2 * | 11/2007 | Batthish et al. ............. 713/152 |
| 2002/0087882 A1 | 7/2002 | Schneier et al. | |
| 2002/0104022 A1 | 8/2002 | Jorgenson | |
| 2002/0129264 A1 | 9/2002 | Rowland et al. | |
| 2003/0126221 A1 | 7/2003 | Tanaka et al. | |
| 2003/0172145 A1 | 9/2003 | Nguyen | |
| 2004/0015579 A1 | 1/2004 | Cooper | |
| 2005/0138432 A1 * | 6/2005 | Ransom et al. ............. 713/201 |
| 2005/0149747 A1 * | 7/2005 | Wesinger et al. ............ 713/200 |
| 2006/0090080 A1 | 4/2006 | Pearson | |
| 2006/0206943 A1 * | 9/2006 | Ellison et al. ................. 726/26 |
| 2006/0272025 A1 * | 11/2006 | Mononen ...................... 726/26 |

(Continued)

OTHER PUBLICATIONS

Chaudhuri M, SMTp: an architecture for next generation scalable multi-threading, Jun. 19, 2004, IEEE, 124-135.*
Yang, H., et al., "Design and Implementation of an Internet-Based Emdedded Control System," CCA 2003 Proceedings of 2003 IEEE Conference on Control Applications, vol. 2, Jun. 2003, pp. 1181-1185.

(Continued)

Primary Examiner—Nasser G Moazzami
Assistant Examiner—Monjour Rahim
(74) Attorney, Agent, or Firm—Workman Nydegger

(57) ABSTRACT

The present invention allows for remotely and securely configuring settings for targeted devices within a network with multiple security-trust boundaries. Configuration information is encoded in messages that are digitally signed to ensure the integrity of the configuration information and sent in accordance with a standard messaging transport protocol. By utilizing an already existing port of the standard messaging transport protocol, e.g., SMTP, the number of open ports for configuration purposes is minimized. Further, example embodiments take advantage of hidden fields, i.e., machine readable fields that contain metadata that by default are not presented at a client user interface, for encoding the configuration or command/control information within the messages. The present invention further provides for a central console module that can manage and report on the status of the configuration settings for a plurality of targeted devices that an authorized user or system administrator has attempted to remotely configure.

36 Claims, 5 Drawing Sheets

U.S. PATENT DOCUMENTS

2007/0083749 A1* 4/2007 Fang ................... 713/152
2007/0088823 A1   4/2007 Fowler
2007/0143857 A1* 6/2007 Ansari ................. 726/26
2007/0180225 A1* 8/2007 Schmidt ............... 713/152
2007/0283444 A1* 12/2007 Jang ................... 726/26

OTHER PUBLICATIONS

Nathan J. Muller, Improving Network Operations With Intelligent Agents, May-Jun. 1997, John Wiley & Sons, Inc. vol. 7-Issue 3, pp. 116-126.

Office Action mailed Apr. 3, 2008 cited in U.S. Appl. No. 11/031,253.

* cited by examiner

SECURE REMOTE CONFIGURATION OF TARGETED DEVICES USING A STANDARD MESSAGE TRANSPORT PROTOCOL

CROSS-REFERENCE TO RELATED APPLICATIONS

N/A

BACKGROUND OF THE INVENTION

1. The Field of the Invention

The present invention generally relates to electronic messaging systems. More specifically, the present invention provides for allowing authorized users to remotely and securely change configuration setting of a targeted device using a standard messaging transport protocol. Further embodiments also provide for central monitoring and reporting of the status of such configuration request.

2. Background and Related Art

Computer systems or related technology affect many aspects of society. Indeed, the computer systems ability to process information has transformed the way we live and work. Computer systems now commonly perform a host of tasks (e.g., word processing, scheduling, database management, etc.) that prior to the advent of the computer system were performed manually.

Although computers were once isolated and had minimal or little interaction with other computers, computers today interact with a wide variety of other computers through Local Area Networks (LANs), Wide Area Networks (WANs), dial-up connections, and so forth. With the wide-spread growth of the Internet, connectivity between computers is becoming more important and has opened up many new applications and technologies. The growth of large-scaled networks and the wide spread availability of the low-cost personal computers has fundamentally changed the way that many people work, interact, communicate and play.

Electronic communications among users of various computer systems have been known for many years. Many companies have developed internal electronic messaging systems that allow email communications between various computers connected to corporate LANs and/or other networks. Further, many companies have reengineered the process and procedures to take maxim advantage of email communications in order to provide a convenient mechanism for exchanging information and documents; thus reducing the handling of paperwork and speeding the flow of information between and among employees of various departments. Traditionally, large-scale network connecting various divisions over vast distances were extremely expensive. In addition, the large-scaled networks that did exist generally used proprietary protocols, which were difficult to interconnect with other networks.

As previously mentioned, however, with the growth and development of the Internet the situation has changed dramatically. Today, a company may install a corporate LAN at sites separated by large geographical distances and "backbone" communications between sites over the Internet. In many ways, the Internet has become a standard with which any viable network must interact.

Regardless of whether a LAN is centrally located or separated by large geographical distance through "back-boning," typical networks have varying levels or boundaries of security-trust. For example, organizations wish to limit and shield the inner organization from attacks of others on the outside of the network. Further, organizations may wish to also restrict accesses to certain portions of information within the network. As such security-trust boundaries are configured to ensure that protected content is accessed by authorized users.

FIG. 1 illustrates an example topology of varying degrees of security-trust boundaries within a network 100. As shown, perimeter network 115 lays in a middle ground between an organizations's trusted internal or private network 120 and an un-trusted external network such as the Internet 105. The perimeter network 115 is a sub-network that may sit between firewalls 110 and 130 for shielding secure clients 140 and secure server 150 from access from unauthorized users outside the network 100. Mail server 125 and Web server 135 within the perimeter network 115, however, need to have limited access to those on the outside; and therefore they are only shielded by a single firewall 110 from those on the outside the network 100 coming in from Internet 105.

Of course, other mail servers may be used within other topologies and security-trust boundaries depending on the organization's security and other needs. For example, secure server 150 may also be a mail server. In such instance, the Mail server 125 within the perimeter network 115 might be used for such things as sanitizing mail (e.g., virus and junk mail scan) and for transferring mail to the appropriate mail box. Secure server 150, on the other hand, may be used for holding individual mailboxes and shielding these mail boxes from those outside the private network 120.

Regardless, however, of the topology and number of security-trust boundaries within a network configuration, often it is desirable to configure various machines with various security and other type settings. Typically, however, authorized users or system administrators have to have direct connectivity or be physically present at the particular device in order to make such configurations changes. This becomes extremely difficult, however, if the system is hard to access either due to physical location or because it is an isolated environment such as perimeter network 115. Accordingly, there exists a need to be able to remotely configure the various machines within a network 100.

One solution to the problem may be to use a protocol such as Remote Procedure Call (RPC) for allowing one program to request and access various machines within the network. Like a regular or Local Procedure Call (LPC), a RPC is a synchronistic operation requiring the requesting program to be suspended until the results of the remote procedure are returned. Accordingly, RPC utilizes a lightweight process or threads to share the same address space and allow multiple RPCs to be preformed concurrently. Such a process, however, requires opening multiple ports upon any individual machine, thereby leaving machines highly vulnerable to attack. As such, there exists a need to remotely configure a targeted device while minimizing the number of ports open for such configuration purposes. Also, it would be useful to have a central console module for monitoring and reporting on the status of all configuration requests regardless of wherein the requests were made and destined.

BRIEF SUMMARY OF THE INVENTION

The above-identified deficiencies and draw backs of current messaging systems with multiple security-trust boundaries are over come by the present invention. For example, in a network computer system the present invention provides for remotely configuring a targeted device while minimizing the number of ports that are open for such configuration purposes by utilization of a standard message transport protocol with an already existing open port. Other exemplary embodiments provide for tracking and monitoring the status of changes made in configuration settings for a remote device by providing a central console that listens for delivery status messages transferred in accordance with the standard message transport protocol.

Exemplary embodiments provide for receiving input from an authorized user for configuring command/control information for a targeted device that is remotely located within the message network. A message is automatically generated, which includes the command/control information in a field of the message that is by default not presented at a user interface display. At least a portion of the message is digitally signed for authenticating and validating the command/control information integrity (e.g., the portion of the message that actually related to the command and control). The message including the command/control information is then transmitted to the targeted device over an existing dedicated open port of a standard messaging transport protocol that is typically used to send message data to recipients for displaying on a user interface.

Other exemplary embodiments provide for receiving, at the targeted device over an existing dedicated open port of a standard messaging protocol, a message that includes command/control information in a field of the message that is by default not presented at a user interface display. The standard messaging protocol typically used to send message data to recipients for displaying on a user interface. The command/control information integrity is authenticated by validating a digital signature associated with at least a portion of the message. Upon authentication, settings of the targeted device are configured in accordance with the command/control information.

Still other exemplary embodiments provide for tracking the status of changes made in configuration setting at a central console. An indication that the configuration information has been sent to a targeted device is received, wherein the configuration information is used to remotely change configuration settings on the targeted device. A status log is written that indicates that the configuration information has been sent to the targeted device. Further, a delivery status message may be received from a targeted device over a standard message transport protocol, the delivery status message indicating whether the targeted device accepted the configuration information. Based on the delivery status message, the status log is automatically updated with additional status information corresponding to the configuration information.

Yet other exemplary embodiments provide for centrally controlling delivery status of configuration settings for a plurality of remote devices by listening for delivery status messages transferred in accordance with a standard message transport protocol. A status log is accessed, that indicates that configuration information has been sent to a plurality of targeted devices in accordance with a standard messaging transport protocol typically used to send message data to recipients for display on a user interface. The configuration information used to remotely change configuration settings on the plurality of targeted devices. Delivery status messages received in accordance with the standard message transport protocol are monitored, wherein the delivery status messages indicate whether the plurality of targeted devices accepted the configuration information. After a predetermined time period without receiving a delivery status message for one or more of the plurality of targeted devices, configuration information is resent to one or more of the plurality of targeted devices in accordance with the standard messaging transport protocol. The resent configuration information is included in a filed of the message that is by default not presented at a user interface display.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
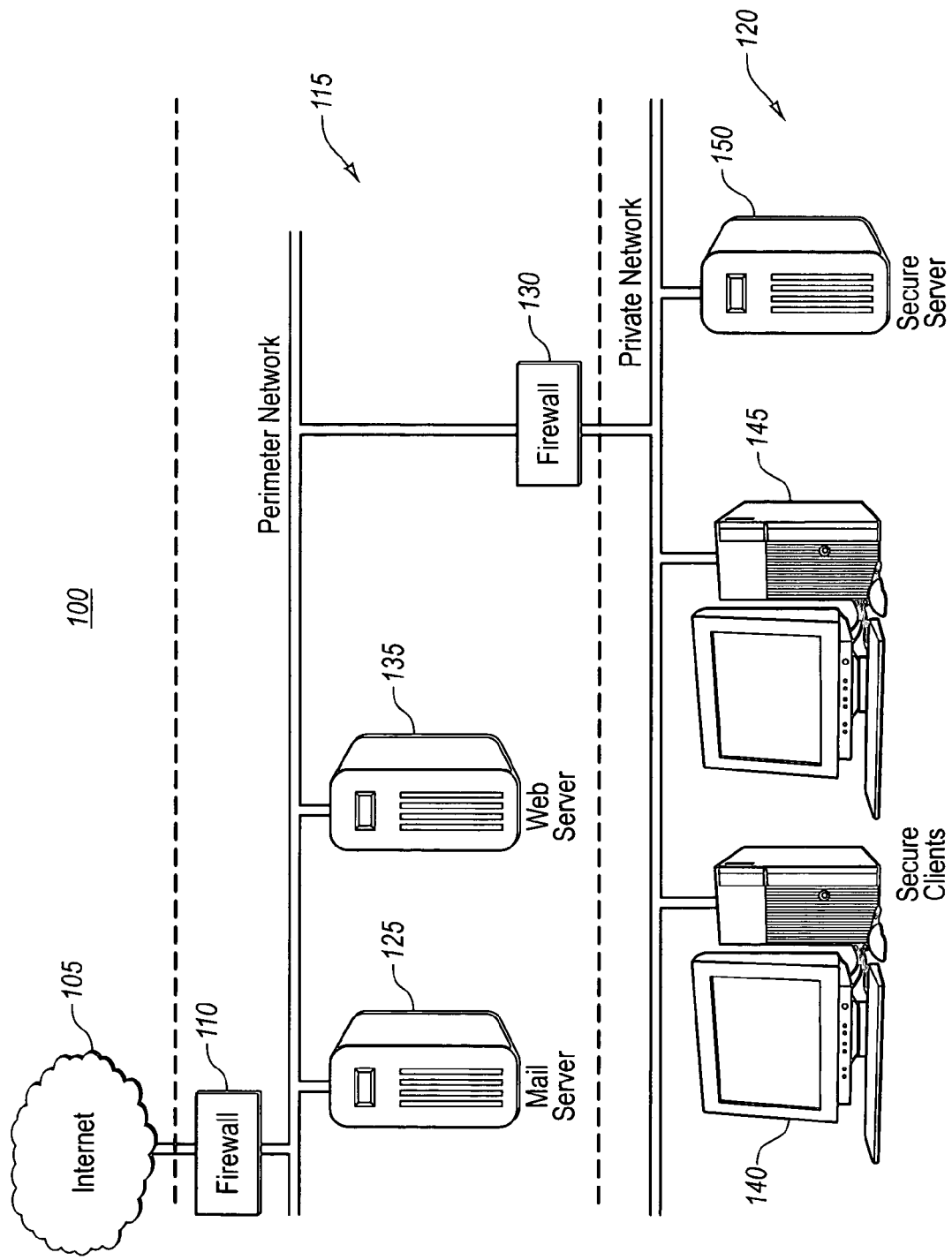
FIG. 1 illustrates a Local Area Network (LAN) with multiple security-trust boundaries.

The present invention extends to methods, systems and computer program products for remotely and securely configuring service settings for a targeted device by utilizing a standard message transport protocol. Further, the present invention provides for central monitoring and reporting of the status of configuration change requests sent to the targeted device. The embodiments of the present invention may comprise a special purpose or general-purpose computer including various computer hardware, as discussed in greater detail below.

The present invention allows for remotely and securely configuring settings for machines within a network with multiple security-trust boundaries. Accordingly, the present invention provides a way to configure targeted devices in a network without requiring the authorized user or system administrator to have direct connectivity or be physically present at the particular targeted device. The present invention utilizes a standard messaging protocol, e.g., Simple Mail Transport Protocol (SMTP), Network Newsgroup Transfer Protocol (NNTP), X.400, or any other well known message transport protocol with an existing and dedicated open port.

By utilizing an already existing port, only those ports that are necessary for normal communications are used, thereby minimizing the number of ports that are open for such configuration purposes. Moreover, example embodiments take advantage of hidden fields, i.e., machine readable fields that contain metadata that by default are not presented at a client user interface for including configuration or command/control information. The present invention further provides for a central console module that can manage and report on the status of the configuration settings for a plurality of targeted devices that the authorized user or system administrator has attempted to remotely configure.

It should be noted that command/control information and configuration information is used herein interchangeably and can represent a myriad of settings to be modified or changed on a device. For example, the configuration information may be associated with settings of a standard message transport protocol, e.g., security settings such as whitelists, blacklists, valid messaging addresses, anti-SPAM settings, anti-virus settings, or any other type of security configuration. Further, the command/control or configuration information may relate to a specific task, e.g., listen on port 25, as well as topology information such as relay all mail from a specific domain name address to a particular IP address, use a particular email address corresponding to an IP address, or relay all mail for a particular domain name to a particular folder or IP address.

Further, the command/control information may relate to policies performed by a specific service or server. Such policies may indicate that messages need to be signed, requests encrypted, or any other myriad of similar policy based actions. Moreover, command/control can include user configuration information, for instance a table of recipients within the organization and which server within the organization these should be forwarded to, or a table of hashes of optionally normalized forms of recipient addresses and the target machines.

It is further noted that the command/control information can correspond to any other well known type of device setting. Accordingly, command/control information and/or configuration information should be broadly construed to encompass any type of configuration setting well known to those in the art. As such, the use of a specific command/control information or configuration setting is used for herein for illustrative purposes only and it is not meant to limit or otherwise narrow the scope of the present invention unless explicitly claimed.

Figure 2:
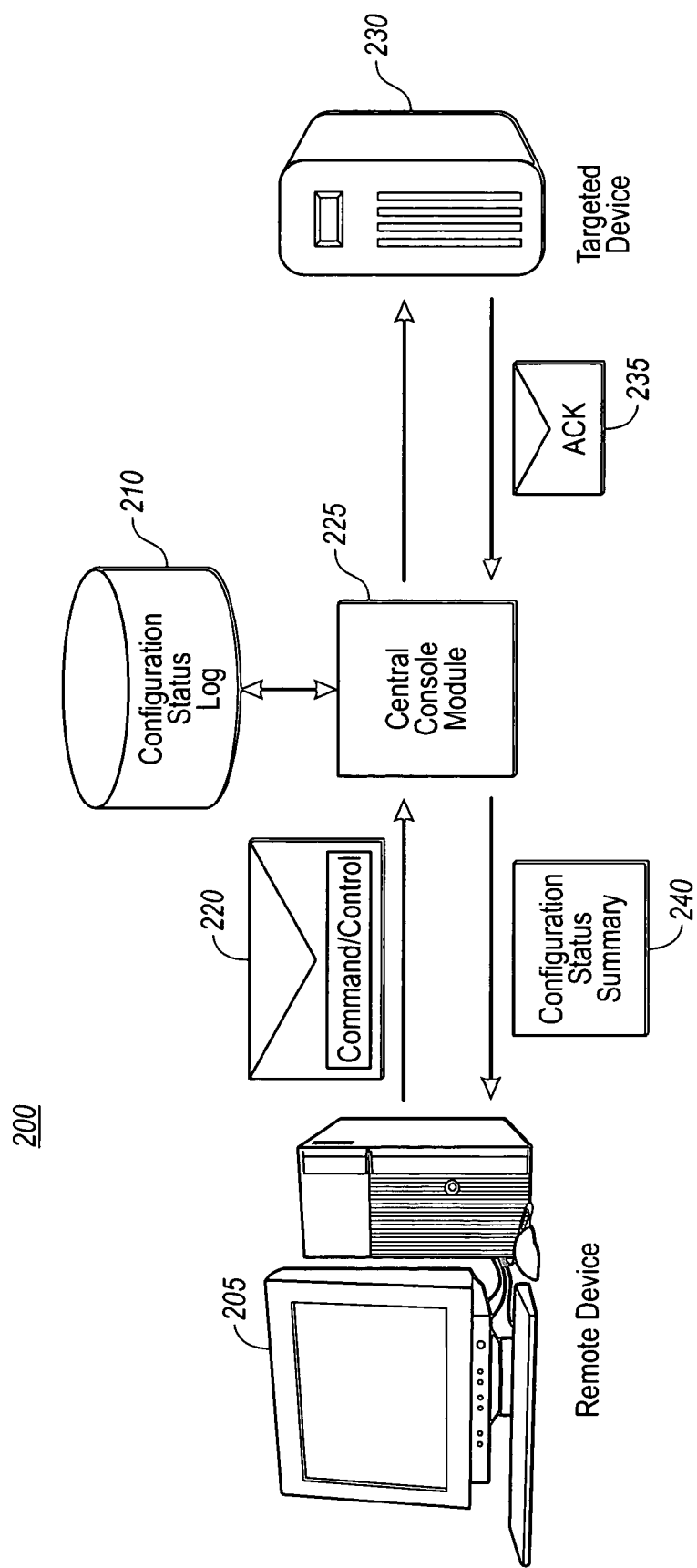
FIG. 2 illustrates a network computer system that allows for remote configuration of a targeted device in accordance with exemplary embodiments of the present invention.

FIG. 2 illustrates various exemplary embodiments of the above-described invention. As illustrated, a network 200 includes a remote device 205 and a central console module 225 configured to assist in transferring configuration information, e.g., command/control information, to targeted device 230. Although not shown, network 200 has multiple security-trust boundaries similar to those previously described with regard to FIG. 1. Further, it should be noted, that although only one remote device 205 and one targeted device 230 are shown, the present invention is not limited to any particular number of remote devices 205 and/or targeted devices 230, nor is the present invention limited to any particular topology or configuration of the network 200. Accordingly, the lay out of the remote device 205 and targeted device 230 in FIG. 2—as well as the configuration of those machines and security-trust boundaries depicted in FIG. 1—are used for illustrative purposes only and are not meant to limit or otherwise narrow the scope of the present invention.

Regardless of the lay out of the network system 200, an authorized user or system administrator can logon to remote device 205 in an attempt to set configuration settings for the targeted device 230. It should be noted that targeted device 230 can sit anywhere within the network security system, e.g., the perimeter network, the private network 120, or in any other security-trust boundary within the network itself. Similarly, the remote device 205 can be located within any security-trust boundary described above including the same one as the targeted device 230; however, typically the remote device 205 will reside in a more secure environment, e.g., private network 120.

Once the user has authenticated themselves as being able to configure settings on the targeted device 230, the present invention provides that the command/control information can be encoded within a message 220 and transported in accordance with a standard messaging transport protocol with an already existing open port, e.g., SMTP, X.400, NNTP, etc. Example embodiments utilize well known encapsulation formats, such as Multipurpose Internet Mail Extensions (MIME), Direct Internet Messaging Encapsulation (DIME), or eXtensible Markup Language (XML) protocols such as Simple Object Access Protocol (SOAP), for encoding the command/control information in a hidden field of the message that is by default not presented at a user interface display. As discussed in greater detail below, these messages may be signed, e.g., MIME may be wrapped in S/MIME to sign the message. The hidden field(s) may be included in any part of the message 220, e.g., a header, body part, etc. Further, the hidden or machine readable field may be an envelope extension of the electronic message 220. Moreover, multiple configuration information or command/control information may also be included in the electronic message 220 in one or more hidden fields. The standard message transport protocol, however, is typically used to send message data to recipients for display on a user interface.

For example, utilizing existing encapsulation mechanisms an electronic message 220 may be generated that includes such things as a header and a payload. Portions of the header and the payload are typically by default presented at a client user interface. For example, when a recipient receives a message, or when a sender is generating a message, typical fields displayed in a user interface include "TO:", "FROM:", "SUBJECT:", and the message itself. Existing protocols also provide for hidden fields within the message 220 that may include metadata that by default is not presented at a messaging client user interface. Although such hidden fields may be able to be accessed and the information displayed through some extensive user input and interaction with the client, typically such fields are considered hidden because they are not by default displayed to a sender or the recipient. Nevertheless, the command/control information may be accessed by a system administrator for visual display.

When the electronic message 220 is sent from the remote device 205 to the targeted device 230 the command/control information is automatically encoded into the one or more hidden fields. As one would recognize, the configuration information may be included within the hidden field of electronic message 220 either before or at the time the message 220 is sent. Further, as previously mentioned, the hidden message may be located anywhere within the message 220, e.g., header, body part, etc., or as an extension of the envelope for the message 220. Accordingly, any reference to the timing of a hidden field location used for inserting or encoding the configuration information into the message 220 is used for illustrative purposes only and is not meant to limit or otherwise narrow the scope of the present invention.

Regardless of when or where the hidden command/control information is generated within message 220, once encoded the command/control information is sent via a standard message transport protocol to the targeted device 230. Prior to sending the electronic message 220, a portion of the message (e.g., the command/control information) or the entire message (e.g., using S/MIME) may be digitally signed by the remote device 205 for authenticating and validating the command/control information integrity. The digital signature may be any one of a public/private key pair, basic HTTP, Window's NTLM, Kerberos, X.509 certificate, Passport, Mac based authentication, XML based, S/MIME or any other well known way to encrypt and/or sign messaging data.

Once the targeted device 230 has received the message 220 with the command/control configuration information, the targeted device 230 can be configured to identify the message as corresponding to configuration information. As such, rather than processing message 220 in accordance with the standard messaging protocol by displaying message data at the user interface, the targeted device can authenticate the command/control information integrity by validating the digital signature associated with the electronic message. Upon validation or authentication, the targeted device 230 can change its settings in accordance with the command/control 220 information. Upon modifying its setting(s), or once the targeted device 230 accepts message 220, an acknowledgement message 235 may be sent to the remote device 205 to verify that the configuration setting(s) have been changed. Of course, if the targeted device 230 does not authenticate the message 220, or does not accept it, a non-acknowledgement message (not shown) may also be sent in accordance with the standard message transport protocol.

Other exemplary embodiments provide for a central console module 225, which can manage and report on the status of command/control information. For example, central console module 225 can receive information that command/control information has been sent to targeted device 230. Upon receiving such notification, central console module 225 can write a status log within the configuration status log store 210 indicating that the configuration information has been sent to the targeted device 230. Central console module 225 then listens for acknowledgement message 235 (or other delivery status messages) indicating that the command/control information 220 has been accepted by the targeted device 230. If no such acknowledgment 235 has been received by central console module 225 after a predetermined time period, central console module 225 can determine to either resend the command/control information 220 in accordance with the above exemplary embodiments, or may choose to abort the process all together. As will be described in greater detail below, the central console module may subsequently report on the status of the configuration information.

Such central console module 225 allows for more centralized control such that multiple configuration settings sent from multiple remote devices 205 to multiple targeted devices 230 can all be managed and reported to authorize users at any machine within the network system 200. It should be noted that although the central console module 225 is shown as accepting message 220 and acknowledgement message 235, other configurations are available to the present invention. For example, remote device 205 may simply indicate to central console module when command/control information has been sent to targeted device 230 and/or whether or not an acknowledgement 235 has also been received. Of course as one would appreciate, other configurations for central monitoring and reporting of status information are available to the present invention. Accordingly, the above described topologies and methods for monitoring and reporting the status of configuration information is used for illustrative purposes only and is not meant to limit or otherwise narrow the scope of the present invention unless explicitly claimed.

In any event, central console module 225 can create a configuration status summary 240 that can be sent to the remote device 205, which yields a summary of changes that have occurred in one or more target devices 230. For example, the configuration status summary 240 may be presented to an authorized user of remote device 205 indicating those settings which have been requested, those which are outstanding, and those that have been acknowledged. As additional information is received at central console module 225, the configuration status summary 240 may be updated and again presented at remote device's 205's user interface display.

The present invention may also be described in terms of methods comprising functional steps and/or non-functional acts. The following is a description of steps and acts that may be performed in practicing the present invention. Usually, functional steps describe the invention in terms of results that are accomplished were as non-functional acts describe more specific actions for achieving a particular result. Although the functional steps and non-functional acts may be described or claimed in any particular order, the present invention is not necessarily limited to any particular order or combination of steps and/or acts. Further, the use of acts and/or steps in the recitation of the claims and in the following description of the flow charts for FIGS. 3-5 are used to indicate the desired specific use of such terms.

Figure 3:
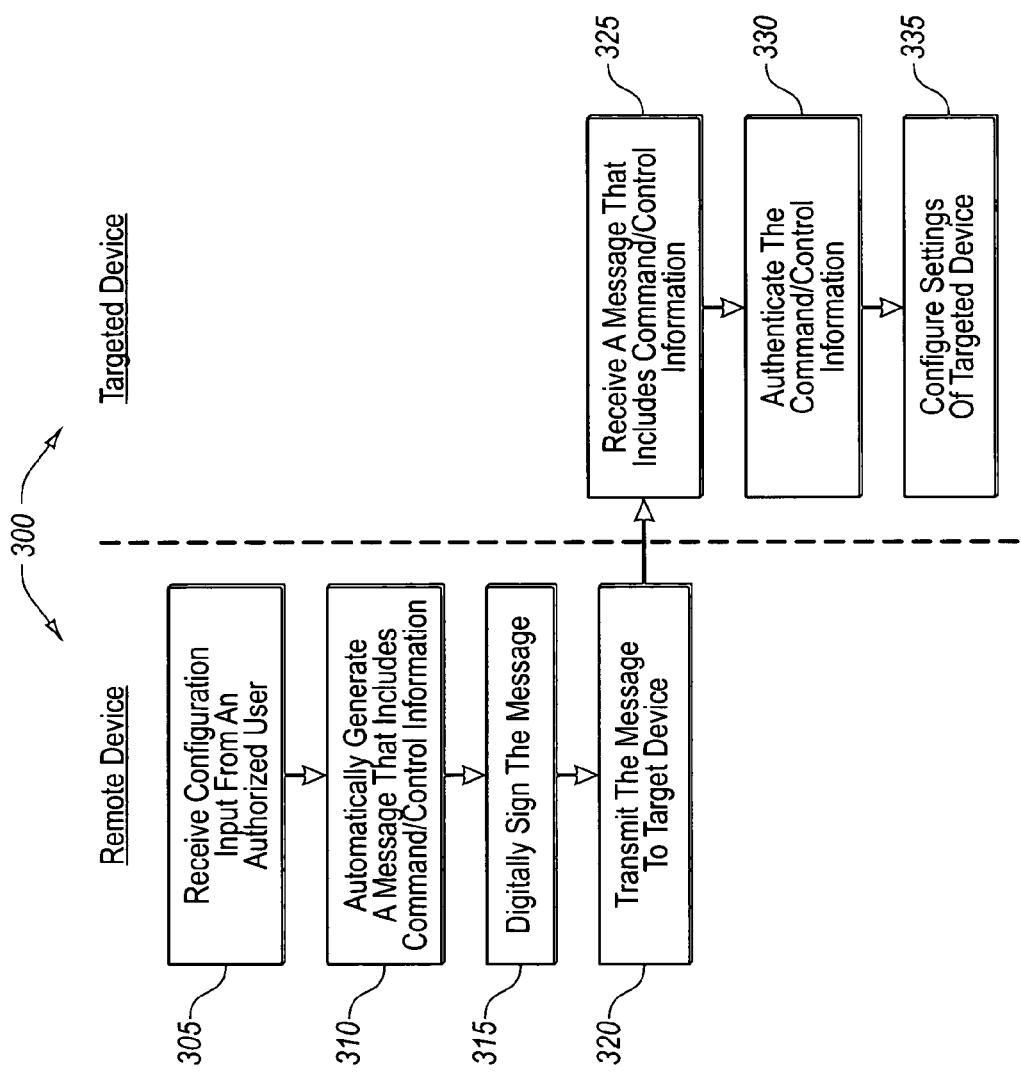
FIG. 3 illustrates a flow chart for remotely configuring a targeted device in accordance with exemplary embodiments of the present invention.
Figure 5:
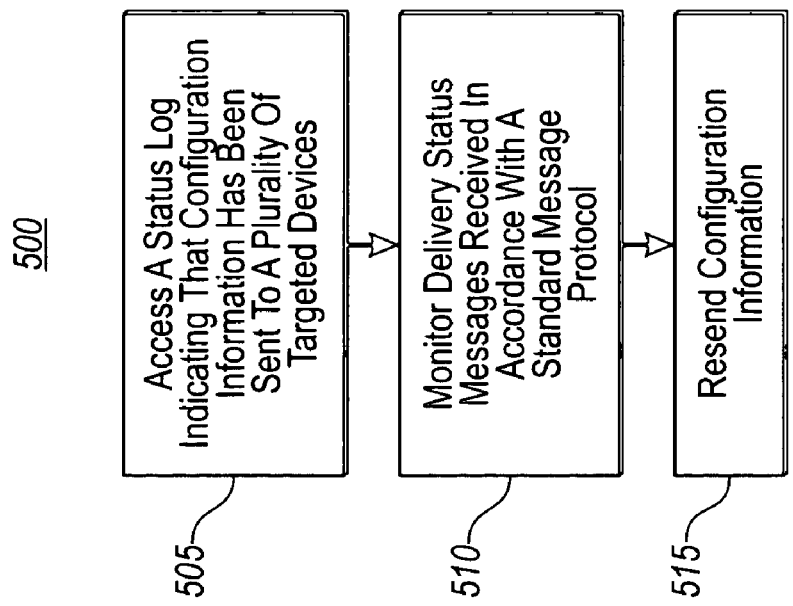
FIG. 5 illustrates a method of centrally controlling delivery status of configuration settings for a plurality of remote devices in accordance with exemplary embodiments of the present invention.
Figure 4:
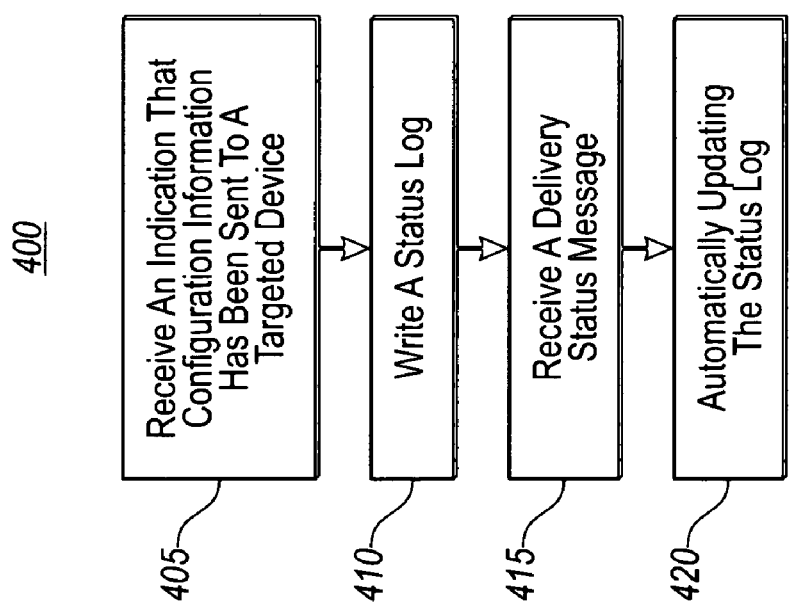
FIG. 4 illustrates a flow chart of a method of tracking the status of changes made in configuration settings for a remote device in accordance with exemplary embodiments of the present invention.

FIGS. 3-5 illustrate example flow charts for various embodiments of the present invention. The following description of FIGS. 3-5 will occasionally refer to corresponding elements from FIGS. 1 and 2. Although reference may be made to a specific element from FIGS. 1 and 2, such elements are used for illustrative purposes only and are not meant to limit or otherwise narrow the scope of the present invention unless explicitly claimed.

FIG. 3 illustrates an example flow chart of a method 300 for remotely configuring a targeted device while minimizing the number of ports that are open for such configuration purposes. From the remote device side, method 300 includes and act of receiving 305 configuration input from an authorized user. For example, remote device 205 may receive input from an authorized user for configuring command/control information for a targeted device 230 that is remotely located within messaging network 200. The messaging network 200 having multiple security-trust boundaries similar to those indicated and referred to in FIG. 1. As previously mentioned, remote device 205 and targeted device 230 may reside anywhere within any security-trust boundary within the network 200. For instance, the targeted device 230 may be a server in the perimeter of the network system 200.

Method 300 also includes an act of automatically generating 310 a message that includes the command/control information. For example, remote device 205 can encode electronic message 220 with command/control information in a field of the message that is by default not presented at a user interface display, i.e., a hidden field as described above. The message encapsulation format may be chosen from any one of MIME, DIME, XML base or other well known format.

Method 300 further includes an act of digitally signing 315 the message. For example, remote device 205 upon authenticating the authorized user or system administrator can digitally sign at least a portion of the message 220 for authenticating and validating the command/control information integrity when received by the targeted device 230. Message 220 may be digitally signed using one of a public/private key pair, based HTTP, Window's NTLM, Kerberos, X.509 certificate, Passport, Mac based authentication, XML based, S/MIME, etc. Further, the command/control information may correspond to configuration settings for a mail server to configure one or more of a whitelist, blacklist, valid message addresses, anti-SPAM settings, anti-Virus settings or other well known security or other configurations for mail servers. For instance, the command/control information may correspond to configuration settings for policies associated with the targeted device.

Method 300 also includes an act of transmitting 320 the message to the targeted device. For example, once the message 220 is digitally signed by remote device 205, the message may be transmitted along with the command/control information to the targeted device 230 over an existing dedicated open port of a standard messaging transport protocol that is typically used to send messages or message data to recipients for displaying on a user interface. The transport protocol may be chosen from any one of SMTP, X.400, NNTP, or other well known message protocol with dedicated open ports.

From the targeted device side, method 300 includes an act of receiving 325 a message that includes command/control information. For example, targeted device 230 may receive over an existing dedicated open port of a standard messaging transport protocol a message that includes command/control information in the field of the message that is by default not presented at user interface display. As previously mentioned, this standard messaging protocol typically is used to send message data to recipient for display on a user interface.

Method 300 also includes on the targeted device side an act of authenticating 330 the command/control information. For instance, when targeted device 230 receives message 220, the digital signature associated therewith can be validated by any well known means for authenticating the command/control information integrity. Upon authentication, method 300 also includes an act of configuring 335 settings of targeted device. That is, upon authentication, configuration settings of the targeted device 230 may be configured in accordance with the command/control information. If the message 220 is received or accepted by targeted device 230, an acknowledgement message 235 may be sent in accordance with the standard messaging protocol indicating such acceptance. Alternatively, if the message is not accepted by targeted device 230, then a similar non-acknowledgement message may be sent to remote device 205 or central console module 225 as previously described. Note that if the message is not authenticated, it will not be acted upon regardless of sending a non-acknowledgement (or possible even a simple acknowledgement that the message was received).

FIG. 4 illustrates an example flow chart of a method 400 of tracking the status of changes made in configuration settings for a remote device. Method 400 includes an act of receiving 405 an indication that the configuration information has been sent to a targeted device. For example, central console unit or module 225 may receive an indication that configuration information has been sent to targeted device 230 for remotely changing configuration settings on the targeted device 230. Method 400 also includes an act of writing 410 a status log. For example, upon receiving the indication central console module 225 can write a status log in the configuration status log store 210 indicating that the configuration information has been sent to the targeted device 230.

Method 400 further includes an act of receiving 415 a delivery status message. For example, central console module 225 may receive a delivery status message (e.g., acknowledgement 235, or non-acknowledgement) over the standard message transport protocol as previously described. The delivery status message indicating whether the targeted device 230 accepted the configuration information or message 220. The configuration information sent in the message 220 may be sent in a field of the message that by default is not presented in a user interface display. Further, at least a portion of the message may be digitally signed using one of a public/private key pair, based HTTP, Window's NTLM, Kerberos, X.509 certificate, Passport, Mac based authentication, XML based, S/MIME, etc.

Based on the delivery status message, method 400 also includes an act of automatically updating 420 the status log. For example, central console module 225 can update configuration status log store 210 to indicate what command/control information or configuration information has been acknowledged, not acknowledged, outstanding, etc.

Other embodiments provide for receiving a plurality of delivery status messages for configuration settings corresponding to a plurality of targeted devices. Based on the plurality of delivery status messages, an authorized user is presented with a visual display representing configuration status summary for each of the targeted devices. The visual display indicating those configuration settings that have been requested, outstanding and/or acknowledged.

FIG. 5 illustrates an example flow chart of a method 500 of centrally controlling delivery status of configuration settings for a plurality of remote devices. Method 500 includes an act of accessing 505 a status log indicating that configuration information has been sent to a plurality of targeted devices. For example, central console module 225 can receive an indication or access status log 210, which indicates that configuration information has been sent to a plurality of targeted devices 230 in accordance with the standard message transport protocol as described above.

Method 500 also includes an act of monitoring 510 delivery status messages received in accordance with the standard messaging protocol. That is, central console module 225 can listen for delivery status messages, e.g., acknowledgement 235, which indicate whether the plurality of targeted devices accepted the configuration information. After a predetermined time period without receiving a delivery status message for one or more of the plurality of targeted devices, method 500 also includes an act of resending 515 configuration information. That is central console module 225 may resend configuration information to those targeted devices 230 for which no corresponding acknowledgement 235 or other delivery status message(s) has been received. The configuration information is resent in a field of message 220 that is by default not presented at a user interface display and in accordance with a standard message transport protocol. Further, at least a portion of the message may be digitally signed using one of a public/private key pair, based HTTP, Window's NTLM, Kerberos, X.509 certificate, Passport, Mac based authentication, XML based, S/MIME, etc.

Other embodiments provide that after a second predetermined time period without receiving a delivery status message for one or more of the plurality of targeted devices, future attempts to resend the configuration information may be aborted by central console module 225. This information may be displayed or relayed to the user along with other status information. For example, embodiments provide for receiving a plurality of delivery status messages for configuration settings corresponding to a plurality of targeted devices. Based on the plurality of delivery status messages, an authorized user is presented with a visual display representing configuration status summary for each of the targeted devices. The visual display indicating those configuration settings that have been requested, outstanding and/or acknowledged.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable storage media can comprise RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable communication medium. Thus, any such connection is properly termed a computer-readable communication medium. Combinations of the above should also be included within the scope of computer-readable media. Computer-executable instructions comprise, for example, instructions and data which cause a general purpose computer, special purpose computer, or special purpose processing device to perform a certain function or group of functions.

Figure 6:
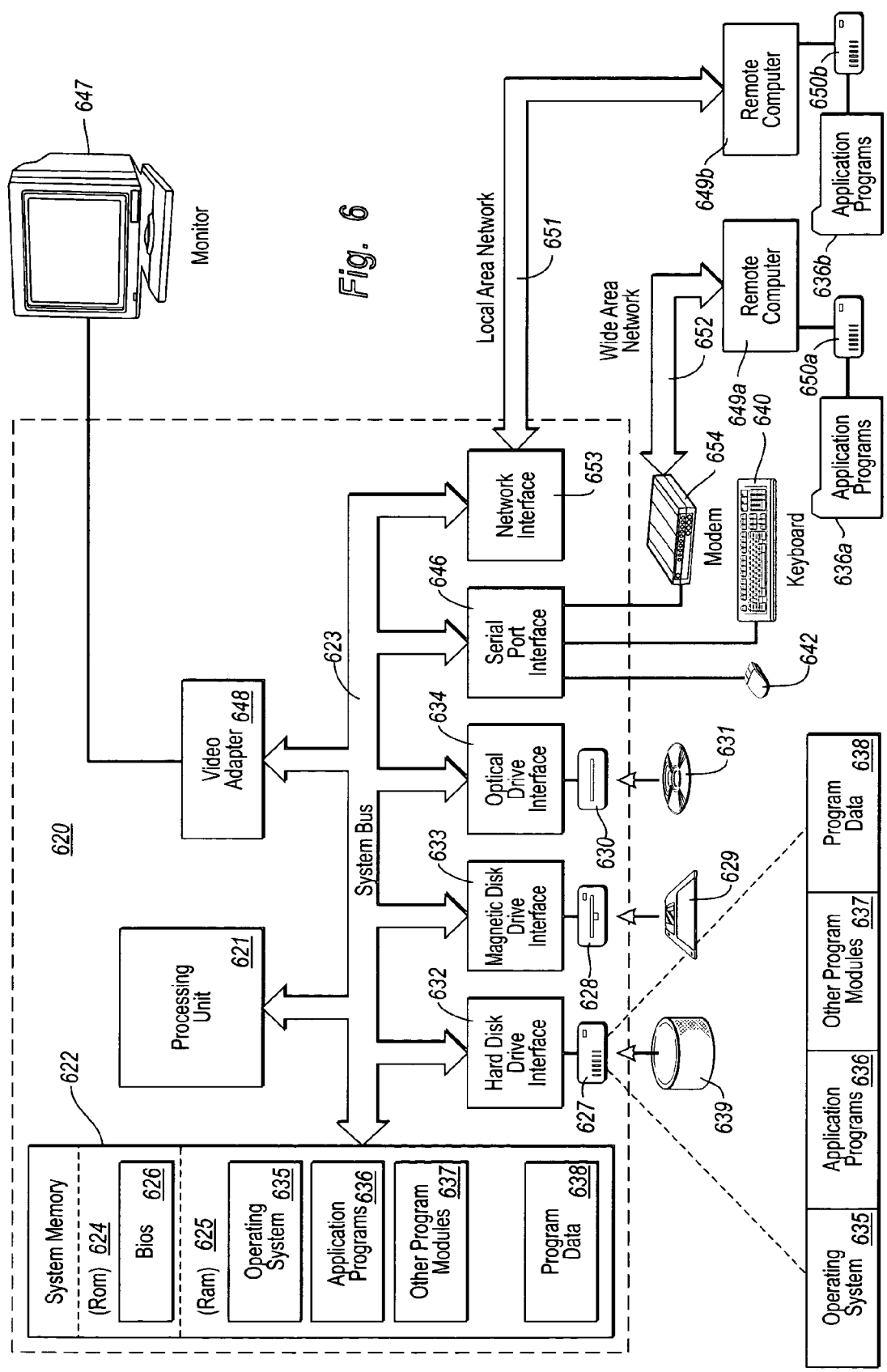
FIG. 6 illustrates an example system that provides a suitable operating environment for the present invention.

FIG. 6 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 6, an example system for implementing the invention includes a general purpose computing device in the form of a conventional computer 620, including a processing unit 621, a system memory 622, and a system bus 623 that couples various system components including the system memory 622 to the processing unit 621. The system bus 623 may be any of several types of bus structures including a memory bus or memory controller, a peripheral bus, and a local bus using any of a variety of bus architectures.

The system memory includes read only memory (ROM) 624 and random access memory (RAM) 625. A basic input/output system (BIOS) 626, containing the basic routines that help transfer information between elements within the computer 620, such as during start-up, may be stored in ROM 624.

The computer 620 may also include a magnetic hard disk drive 627 for reading from and writing to a magnetic hard disk 639, a magnetic disk drive 628 for reading from or writing to a removable magnetic disk 629, and an optical disc drive 630 for reading from or writing to removable optical disc 631 such as a CD-ROM or other optical media. The magnetic hard disk drive 627, magnetic disk drive 628, and optical disc drive 630 are connected to the system bus 623 by a hard disk drive interface 632, a magnetic disk drive-interface 633, and an optical drive interface 634, respectively. The drives and their associated computer-readable media provide nonvolatile storage of computer-executable instructions, data structures, program modules and other data for the computer 620. Although the exemplary environment described herein employs a magnetic hard disk 639, a removable magnetic disk 629 and a removable optical disc 631, other types of computer readable media for storing data can be used, including magnetic cassettes, flash memory cards, digital versatile discs, Bernoulli cartridges, RAMs, ROMs, and the like.

Program code means comprising one or more program modules may be stored on the hard disk 639, magnetic disk 629, optical disc 631, ROM 624 or RAM 625, including an operating system 635, one or more application programs 636, other program modules 637, and program data 638. A user may enter commands and information into the computer 620 through keyboard 640, pointing device 642, or other input devices (not shown), such as a microphone, joy stick, game pad, satellite dish, scanner, or the like. These and other input devices are often connected to the processing unit 621 through a serial port interface 646 coupled to system bus 623. Alternatively, the input devices may be connected by other interfaces, such as a parallel port, a game port or a universal serial bus (USB). A monitor 647 or another display device is also connected to system bus 623 via an interface, such as video adapter 648. In addition to the monitor, personal computers typically include other peripheral output devices (not shown), such as speakers and printers.

The computer 620 may operate in a networked environment using logical connections to one or more remote computers, such as remote computers 649a and 649b. Remote computers 649a and 649b may each be another personal computer, a server, a router, a network PC, a peer device or other common network node, and typically include many or all of the elements described above relative to the computer 620, although only memory storage devices 650a and 650b and their associated application programs 636a and 636b have been illustrated in FIG. 6. The logical connections depicted in FIG. 6 include a local area network (LAN) 651 and a wide area network (WAN) 652 that are presented here by way of example and not limitation. Such networking environments are commonplace in office-wide or enterprise-wide computer networks, intranets and the Internet.

When used in a LAN networking environment, the computer 620 is connected to the local network 651 through a network interface or adapter 653. When used in a WAN networking environment, the computer 620 may include a modem 654, a wireless link, or other means for establishing communications over the wide area network 652, such as the Internet. The modem 654, which may be internal or external, is connected to the system bus 623 via the serial port interface 646. In a networked environment, program modules depicted relative to the computer 620, or portions thereof, may be stored in the remote memory storage device. It will be appreciated that the network connections shown are exemplary and other means of establishing communications over wide area network 652 may be used.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A method implemented in a network computer system having multiple security-trust boundaries, the method remotely configuring a targeted device while minimizing the number of ports that are open for such configuration purposes by utilizing a standard messaging transport protocol with an already existing open port, the method comprising acts of:
   receiving input from an authorized user for configuring command/control information for a target device that is remotely located within a messaging network;
   automatically generating a message that includes the command/control information in a field of the message that is by default not presented at a user interface display;
   digitally signing at least a portion of the message for authenticating and validating the command/control information integrity;
   transmitting the electronic message including the command/control information to the target device over an existing dedicated open port of a standard messaging transport protocol that is typically used to send message data to recipients for displaying on a user interface; and
   notifying a central console module that the command/control information has been sent to the target device, wherein the central console module provides central monitoring and reporting of configuration changes from one or more remote devices to multiple target devices within the network computer system.

2. The method of claim 1, wherein the message encapsulation format is chosen from MIME, DIME or XML based.

3. The method of claim 1, wherein the standard messaging transport protocol is chosen from SMTP, X.400 or NNTP.

4. The method of claim 1, wherein the at least a portion of the electronic message is digitally signed using one of a public/private key pair, basic HTTP, Windows NTLM, Kerberos, X.509 certificate, passport, MAC based authentication XML based or S/MIME.

5. The method of claim 1, wherein an acknowledgement message is received in accordance with the standard messaging transport protocol indicating that the configuration information has been accepted by the targeted device.

6. The method of claim 1, wherein a non-acknowledgement message is received in accordance with the standard messaging transport protocol indicating that the configuration information was not accepted by the targeted device.

7. The method of claim 1, wherein the command/control information corresponds to configuration settings for a mail server to configure one or more of a whitelists, blacklists, valid messaging addresses, anti-spam settings or anti-virus settings.

8. The method of claim 7, wherein the targeted device is a server in a perimeter of the network system.

9. The method of claim 1, wherein the command/control information corresponds to configuration settings for policies associated with the targeted device.

10. The method of claim 1, wherein notifying the central console module that the command/control information has been sent to the target device comprises sending the message to the central console module.

11. In a network computer system having multiple security-trust boundaries, a method of remotely configuring a targeted device while minimizing the number of ports that are open for such configuration purposes by utilizing a standard messaging transport protocol with an already existing open port, the method comprising acts of:
   receiving, at a targeted device over an existing dedicated open port of a standard messaging transport protocol, a message that includes command/control information in a field of the message that is by default not presented at a user interface display, the standard messaging transport protocol typically used to send message data to recipients for displaying on a user interface;
   authenticating the command/control information integrity by validating a digital signature associated with at least a portion of the message;
   upon authentication, configuring settings of the targeted device in accordance with the command/control information; and
   after authentication, sending an acknowledgement message for receipt by a central console module, the acknowledgement message indicating that the command/control information has been accepted by the targeted device, and wherein the central console module provides central monitoring and reporting of configuration changes from one or more remote devices to multiple targeted devices within the network computer system.

12. The method of claim 11, wherein the message encapsulation format is chosen from MIME, DIME or XML based.

13. The method of claim 12, wherein the standard messaging transport protocol is chosen from SMTP, X.400 or NNTP.

14. The method of claim 13, wherein the at least a portion of the message is digitally signed using one of a public/private key pair, basic HTTP, Windows NTLM, Kerberos, X.509 certificate, passport, MAC based authentication XML based or S/MIME.

15. The method of claim 11, wherein the command/control information corresponds to configuration settings for a mail server to configure one or more of a whitelists, blacklists, valid messaging addresses, anti-spam settings or anti-virus settings.

16. The method of claim 11, wherein the targeted device is a server in a perimeter of the network system.

17. The method of claim 11, wherein the command/control information corresponds to configuration settings for policies associated with the targeted device.

18. The method of claim 11, wherein the authentication fails and a non-delivery message is sent to a sender of the message.

19. A computer program product for use in a network computer system having multiple security-trust boundaries, the computer program product for implementing a method of remotely configuring a targeted device while minimizing the number of ports that are open for such configuration purposes by utilizing a standard messaging transport protocol with an already existing open port, the computer program product comprising one or more computer readable storage media having stored thereon computer executable instructions that, when executed by a processor, cause the network computer system to perform the following:
   receive input from an authorized user for configuring command/control information for a target device that is remotely located within a messaging network;

automatically generate a message that includes the command/control information in a field of the message that is by default not presented at a user interface display;
digitally sign at least a portion of the message for authenticating and validating the command/control information integrity;
transmit the electronic message including the command/control information to the target device over an existing dedicated open port of a standard messaging transport protocol that is typically used to send message data to recipients for displaying on a user interface; and
notify a central console module that the command/control information has been sent to the target device, wherein the central console module provides central monitoring and reporting of configuration changes from one or more remote devices to multiple target devices within the network computer system.

20. The computer program product of claim 19, wherein the message encapsulation format is chosen from MIME, DIME or XML based.

21. The computer program product of claim 19, wherein the standard messaging transport protocol is chosen from SMTP, X.400 or NNTP.

22. The computer program product of claim 19, wherein the at least a portion of the electronic message is digitally signed using one of a public/private key pair, basic HTTP, Windows NTLM, Kerberos, X.509 certificate, passport, MAC based authentication XML based or S/MIME.

23. The computer program product of claim 19, wherein an acknowledgement message is received in accordance with the standard messaging transport protocol indicating that the configuration information has been accepted by the targeted device.

24. The computer program product of claim 19, wherein a non-acknowledgement message is received in accordance with the standard messaging transport protocol indicating that the configuration information was not accepted by the targeted device.

25. The computer program product of claim 19, wherein the command/control information corresponds to configuration settings for a mail server to configure one or more of a whitelists, blacklists, valid messaging addresses, anti-spam settings or anti-virus settings.

26. The computer program product of claim 25, wherein the targeted device is a server in a perimeter of the network system.

27. The computer program product of claim 19, wherein the command/control information corresponds to configuration settings for policies associated with the targeted device.

28. A method implemented in network computer system having multiple security-trust boundaries, the method for remotely configuring a targeted device while minimizing the number of ports that are open for such configuration purposes by utilizing a standard messaging transport protocol with an already existing open port, the method comprising the following:
receiving, at a central console module, a notification that a remote device has transmitted a message to a targeted device over an existing dedicated open port of a standard messaging transport protocol, the message including command/control information in a field of the message that is by default not presented at a user interface display, the standard messaging transport protocol typically used to send message data to recipients for displaying on a user interface, and wherein the notification received at the central console module includes at least an indication of the command/control information sent to the targeted device, and wherein the central console module provides central monitoring and reporting of configuration changes from multiple remote devices and multiple target devices within the network computer system;
upon receiving the notification, writing a status log within a configuration status log store, the status log indicating that the command/control information has been sent to the targeted device;
listening, at the central console module, for an acknowledgement message indicating that the command/control information has been accepted by the targeted device, wherein listening includes listening for up to a predetermined time period and:
when no acknowledgement message is received within the predetermined time period, updating the status log to indicate that the command/control information is not acknowledged;
when the acknowledgement message is received within the predetermined time period, updating the status log to indicate that the command/control information has been acknowledged, wherein the acknowledgment message is received only when the targeted device has authenticated the command/control information integrity by validating a digital signature associated with at least a portion of the message; and
transmitting, from the central console module, a status summary to the remote device, the status summary yielding a summary of changes that have occurred in the targeted device, including changes which are outstanding and those which have been acknowledged.

29. The method of claim 28, wherein the message encapsulation format is chosen from MIME, DIME or XML based.

30. The method of claim 28, wherein the standard messaging transport protocol is chosen from SMTP, X.400 or NNTP.

31. The method of claim 30, wherein the at least a portion of the message is digitally signed using one of a public/private key pair, basic HTTP, Windows NTLM, Kerberos, X.509 certificate, passport, MAC based authentication XML based or S/MIME.

32. The method of claim 28, wherein the command/control information corresponds to configuration settings for a mail server to configure one or more of a whitelists, blacklists, valid messaging addresses, anti-spam settings or anti-virus settings.

33. The method of claim 28, wherein the targeted device is a server in a perimeter of the network system.

34. The method of claim 28, wherein the command control information corresponds to configuration settings for policies associated with the targeted device.

35. The method of claim 28, wherein the command/control information in the message is included in field in a header of the message.

36. The method of claim 28, wherein when no acknowledgement message is received within the predetermined time period, resending the command/control information over the existing dedicated open port of a standard messaging transport protocol and in a field of a resent message that is by default not presented at the user interface display, and wherein the method further includes:
listening for a second predetermined time period for an acknowledgement message indicating that the command/control information of the resent message has been accepted by the targeted device and, when the acknowledgement message is not received within the second predetermined time period, aborting attempts to resend the command/control information to the targeted device.

* * * * *

UNITED STATES PATENT AND TRADEMARK OFFICE
CERTIFICATE OF CORRECTION

| | | |
|---|---|---|
| PATENT NO. | : 7,516,480 B2 | Page 1 of 1 |
| APPLICATION NO. | : 10/971402 | |
| DATED | : April 7, 2009 | |
| INVENTOR(S) | : Malcolm E. Pearson et al. | |

It is certified that error appears in the above-identified patent and that said Letters Patent is hereby corrected as shown below:

In column 16, line 45, in Claim 34, delete "command control" and insert
-- command/control --, therefor.

Signed and Sealed this
Third Day of May, 2011

David J. Kappos
*Director of the United States Patent and Trademark Office*